(12) United States Patent
Cras

(10) Patent No.: US 9,229,982 B2
(45) Date of Patent: Jan. 5, 2016

(54) PROCESSING QUERIES USING ORIENTED QUERY PATHS

(75) Inventor: Jean-Yves Cras, Paris (FR)

(73) Assignee: SAP France S.A., Paris (FR)

( * ) Notice: Subject to any disclaimer, the term of this patent is extended or adjusted under 35 U.S.C. 154(b) by 1119 days.

(21) Appl. No.: 12/343,371

(22) Filed: Dec. 23, 2008

(65) Prior Publication Data

US 2010/0161651 A1    Jun. 24, 2010

(51) Int. Cl.
*G06F 17/30* (2006.01)

(52) U.S. Cl.
CPC ................... *G06F 17/30466* (2013.01)

(58) Field of Classification Search
None
See application file for complete search history.

(56) References Cited

U.S. PATENT DOCUMENTS

| | | | |
|---|---|---|---|
| 5,287,493 A * | 2/1994 | Jacopi | 1/1 |
| 5,555,403 A | 9/1996 | Cambot et al. | |
| 5,761,654 A | 6/1998 | Tow | |
| 6,029,162 A * | 2/2000 | Schultz | 1/1 |
| 6,038,538 A * | 3/2000 | Agrawal et al. | 705/7.11 |
| 6,108,698 A * | 8/2000 | Tenev et al. | 709/220 |
| 6,496,819 B1 * | 12/2002 | Bello et al. | 1/1 |
| 7,814,087 B2 * | 10/2010 | Henriot | 707/708 |
| 2006/0074858 A1 * | 4/2006 | Etzold et al. | 707/3 |
| 2006/0161557 A1 * | 7/2006 | Dettinger et al. | 707/100 |
| 2007/0230488 A1 * | 10/2007 | Yu et al. | 370/408 |
| 2008/0183659 A1 * | 7/2008 | Kuttan et al. | 707/2 |
| 2010/0131490 A1 * | 5/2010 | Lamb et al. | 707/714 |

FOREIGN PATENT DOCUMENTS

| EP | 0875838 A2 | 11/1998 |
|---|---|---|
| WO | WO-2010091191 A2 | 8/2010 |

OTHER PUBLICATIONS

Edmonds, "Optimum Branchings," (Dec. 1967) Journal of Research of the Nat'l Bureau of Standards, p. 233-240.*
Lee et al, "Optimizing Large Join Queries Using a Graph-Based Approach," (Mar./Apr. 2001), IEEE Transactions on Knowledge and Data Engineering, vol. 13, No. 2, p. 298-315.*
Extended European Search Report dated Jul. 5, 2011, issued by the European Patent Office in connection with corresponding EP application No. 09175423.4.

* cited by examiner

*Primary Examiner* — Charles Adams
(74) *Attorney, Agent, or Firm* — Mintz Levin Cohn Ferris Glovsky and Popeo, P.C.

(57) ABSTRACT

A computer readable storage medium includes executable instructions to specify a set of database tables defining vertices and database joins defining oriented edges to form a graph. The oriented edges specify directionality characterizing dependent relationships between database tables. A query path in the graph is identified. The graph is split into a set of directed acyclic graphs. Each directed acyclic graph has a single root vertex that does not form a path to itself through oriented edges. Selected oriented edges are removed from each directed acyclic graph to form a tree corresponding to each directed acyclic graph. The tree is a sub-graph of a directed acyclic graph without loops and one list of joins relates any two database tables in the tree. A database query is generated for each tree. The database query is applied to database tables to form query results. The query results are displayed.

10 Claims, 9 Drawing Sheets

PROCESSING QUERIES USING ORIENTED QUERY PATHS

FIELD OF THE INVENTION

This invention relates generally to processing information in databases. More particularly, this invention relates to processing queries against databases using oriented query paths.

BACKGROUND OF THE INVENTION

U.S. Pat. No. 5,555,403, which is incorporated by reference herein, discloses techniques for associating user-friendly business names called "business objects" to database entities. The user-friendly business names offer an abstraction of the underlying database schema. The business names are then used to create a symbolic query. The symbolic query is then converted to a database query, typically in Structured Query Language (SQL). The decision of which SQL query to generate determines the semantics of the query.

Today, this decision is in large part based on additional metadata that describe which tables in a logical database schema are related to objects in the symbolic query, and how these tables are related through links called "joins". Determining a set of SQL statements associated with a user query is equivalent to identifying one or several trees in the graph whose vertices are tables and edges are joins. A graph is a pair (N. A), where N is a set of vertices (e.g., tables, entities) and A is a set of edges (e.g., joins, relations). A tree is a graph without loops where exactly one list of joins relates any two tables. A loop is a non-empty minimal path relating a vertex to itself. The resultant set of trees is called a query path. For the purposes of this description, the technique for finding such trees is sometimes referred to as "pathfinder".

Existing techniques aim to create physical queries against one or several data sources based on a higher-level query specification that only contains business objects. In order to do so, object-level information, such as the qualification of objects (measures vs. dimensions or details) is relied upon. An entity-relationship diagram that provides a logical model for tables and joins exposed by the data sources or created by the user may also be used.

The tables in this model are created beforehand and they may include logical entities that enrich the expressive power of queries (virtual tables) or remove possible ambiguities upfront (aliases). Likewise, joins are created across these tables either automatically through strategies or manually; they may include shortcut joins aimed at further optimizing query generation. Last, the user creates groups of joins called contexts that are aimed at resolving ambiguous queries. Thus, a context is a list of joins. By specifying a context, one specifies that all the joins used to relate the tables' underlying objects in a query must belong to this context.

When generating physical queries from business objects, several phases are invoked. Initially, the tables associated with specified objects and filters of a query are determined. Next, a path containing joins connecting all these tables is identified. A path is a collection of linked edges and vertices.

The path determines a large part of the query semantics. Quite often this path is not unique and a user is solicited for input. The user can pick a context and exclude some joins, which will restrict the number of possible paths until only one is retained. This iterative process of generating paths and getting user input in case of ambiguity is referred to as pathfinder. The pathfinder technique relies on a higher-level abstraction than the entity relationship model itself, it sees tables as vertices and joins as edges in a graph, and relies on classical graph algorithms to generate candidate paths or detect ambiguities due to cycles in the graph.

Once a unique path connecting all tables in the query has been identified, a large part of the query semantics is determined. Additional decisions can be made: splitting the query if the chosen path is not a tree, applying shortcut joins to enhance query performance, and/or warning users against Cartesian products. Then the chosen path (or each sub-tree of it in the case of a split query) is handed over to the physical query generation subsystem which will generate a physical query (typically in SQL). Whenever multiple flows are generated, the path also contains the information necessary to determine how these flows should be further synchronized.

Existing pathfinder techniques do not rely on any assumption about the cardinality of joins. That is, the pathfinder techniques do not change behavior depending on whether a join has "many to one", "one to one" or "many to many" semantics. As a result, many of the paths currently generated do not make sense. This results because the existing techniques work on an undirected graph and generate trees that relate all vertices of the query. The techniques do not take into account the orientation of joins—or edges—to propose intuitive query semantics. This is complemented by sophisticated context and alias generation mechanisms, but whether these are properly applied is the designer's responsibility. These mechanisms are tricky and their maintenance is expensive. Any mistake in this area may lead to counter-intuitive query results. Also, too often the user is left with a choice between a sensible and a not so sensible interpretation of a query. This raises a number of problems, which can be partly addressed by a specific technique, but at the cost of additional settings and metadata that increase the cost of design and of maintenance of the semantic layer. For instance, a query may look ambiguous if the orientation of joins is not taken into account, whereas the ambiguity could be resolved automatically using this information. Another problem is that in certain cases wrong calculations could be performed, resulting in a case of "inflated results".

In view of the foregoing, it would be desirable to identify techniques to reduce the number of query paths considered during the analysis of a database query.

SUMMARY OF THE INVENTION

The invention includes a computer readable storage medium with executable instructions to specify a set of database tables defining vertices and database joins defining oriented edges to form a graph. The oriented edges specify directionality characterizing dependent relationships between database tables. A query path in the graph is identified. The graph is split into a set of directed acyclic graphs. Each directed acyclic graph has a single root vertex that does not form a path to itself through oriented edges. Selected oriented edges are removed from each directed acyclic graph to form a tree corresponding to each directed acyclic graph. The tree is a sub-graph of a directed acyclic graph without loops and one list of joins relates any two database tables in the tree. A database query is generated for each tree. The database query is applied to database tables to form query results. The query results are displayed.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The invention reduces the number of query paths considered during the analysis of a database query by leveraging the functional dependencies expressed by oriented joins. The invention focuses on the issue of determining more accurate query semantics that take oriented information into account when it is available and can be trusted. Instead of considering tables and joins as defining a non-directed graph, as is the case today, tables and joins are now abstracted into a directed graph, whose edges—that represent the joins—are oriented. An edge goes from table A to table B if a join between A and B has cardinality "many A to one B".

Figure 1:
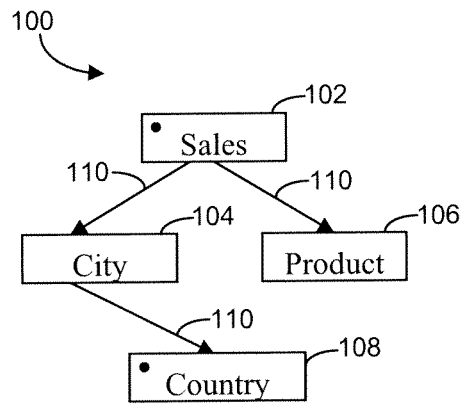
FIG. 1 illustrates a database model represented as a directed acyclic graph.

FIG. 1 represents a logical database model abstracted into a directed graph 100. The database model includes sales 102, city 104, product 106 and country 108 objects. The vertices (boxes 102, 104, 106 and 108) represent tables (including aliases or virtual tables) from an entity relation model. Vertices 102 and 108 are involved in the query. Throughout this disclosure, vertices involved in a query are marked with a circle, as shown in blocks 102 and 108 of FIG. 1.

The edges or arrows 110 between the vertices are oriented. Recall that existing techniques ignore orientation. These edges represent oriented joins. More exactly, they represent joins with cardinality N→0 . . . 1. In relational terms, the source table has a foreign key to the target table, and this key may be null. Heterogeneous joins between two data sources are represented by bi-directional arrows that can be navigated in both directions.

Figure 2:
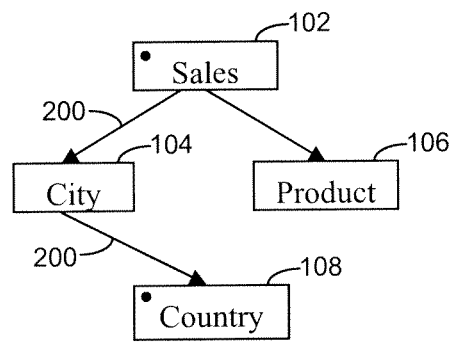
FIG. 2 illustrates a query path within the directed acyclic graph of FIG. 1.

A query path is a subset of edges that connects the vertices associated with a query and obeys certain conditions. FIG. 2 represents a query path for the query represented in FIG. 1. The thick lines 200 represent the edges that are actually chosen to process a query. Given this notation, one can consider the problems associated with existing techniques.

Figure 3:
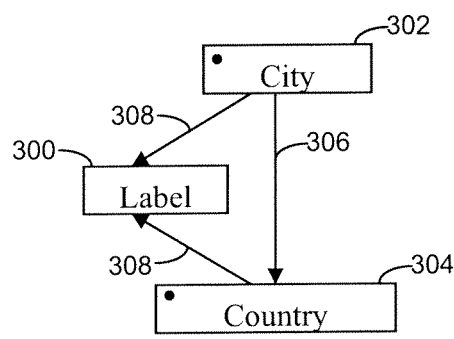
FIG. 3 illustrates a graph including a label table.

Consider a label table. A label table contains descriptions for heterogeneous objects in a database. FIG. 3 illustrates a label table 300 and associated objects city 302 and country 304. In this example, both city 302 and country 304 have a label, which may be a long description. So each table (city 302 and country 304) is joined with the (common) table of labels 300, even though each row in the label table will be dedicated to one specific object, e.g., a country or a city. Separately, there is also a join between tables city 302 and country 304 to capture the fact that any city is in a country.

Assume that the objects country 304 and city 302 are in a query. Using today's techniques, the query would be deemed ambiguous, because there are multiple ways of building a tree that relates the two tables. One could use the direct join from city 302 to country 304, as shown with arrow 306, or one could use the joins that go through the table of labels 300.

In order to avoid this ambiguity, using the current technology, one would have to create a context or (much more likely) to create an alias for the table of labels. One variant of the table label would be joined to the table of countries (only), and another would be joined to the table of cities. This would remove the ambiguity in the user query above, but this would make it impossible to retrieve the list of all labels at once.

Using the orientation of joins, one could automatically determine a unique sensible interpretation for the query. Since the two joins related to the table label are oriented towards this table, as shown with arrows 308, they express the fact that a city determines a label and, independently, a country determines a label; but they do not state a direct relationship between city and country. On the other hand the other join from city to country, as shown with arrow 306, specifies that each city has a country. The invention leverages relationships between entities to support query analysis.

Figure 4:
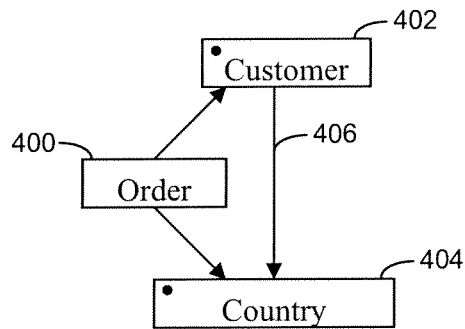
FIG. 4 illustrates an ambiguous graph.

A similar situation occurs in FIG. 4. Here, a fact table with orders 400 has two foreign keys to customer 402 and country 404. This expresses that an order is passed for a certain customer and delivered in a certain country. Separately, each customer has a country (e.g., the headquarter country).

Using today's technology, a query for (customer, country) would be considered ambiguous. But since there exists a unique directed link from customer to country, as shown with arrow 406, one can infer that the user wants the country of each customer, and not the list of customers and countries for each order.

Figure 5:
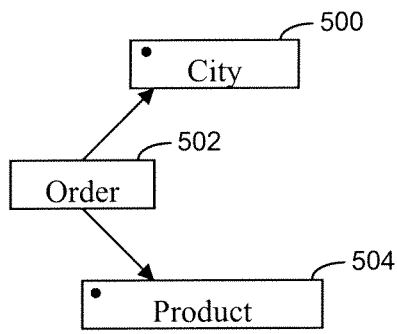
FIG. 5 illustrates an ambiguous graph.

Because of its pure relational heritage, current technology endeavors to relate any two tables even though it can only do so by introducing Cartesian products that the user may not be aware of. Consider FIG. 5, which relates the entities city 500, order 502 and product 504. For a query related to cities and products, one does not want to retrieve as many tuples as there are orders, as this may mean the full Cartesian product of both dimension domains. Instead, one wants a list of cities and a list of products.

Figure 6:
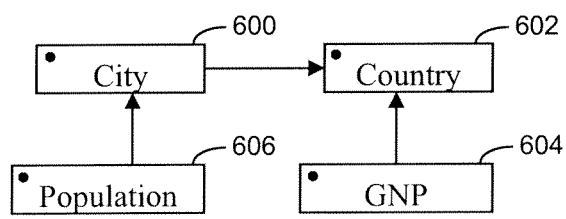
FIG. 6 illustrates a graph that is vulnerable to produce inflated results.

A related issue is known as "inflated results". Consider the entities city 600, country 602, GNP 604, and population 606 of FIG. 6. If one incorrectly associates GNP with city, this can lead to erroneous results. That is, the GNP figure for a country would be duplicated across all cities of the country. Consequently, GNP calculations would return wrong (inflated) values. It should be noted that GNP is not dependent (not functionally linked to) city. The current technology correctly splits the query into two different SQL queries to address this issue. The problem with this approach is that it creates multiple SQL queries per measure even in cases when this is not necessary.

By taking the orientation of joins into account, one can detect such situations and solve them automatically without user intervention or additional settings. Therefore, the invention leverages the orientation of joins during query processing. This reduces erroneous results and the number of SQL statements that need to be processed.

Currently, any non-oriented tree that relates all tables in a query is an acceptable candidate. The invention automatically eliminates many potential paths. As a result, there are fewer user interactions required to eliminate paths. Nevertheless, at times, user input regarding candidate paths may be solicited.

Once a query path has been obtained, one can automatically split it into a collection of trees. Each tree lends itself to the generation of a SQL statement, using technology such as disclosed in the previously referenced U.S. Pat. No. 5,555,403. Thereafter, the different SQL workflows can be synchronized in a client tool along common columns. This behavior is already implemented by tools such as SAP™ Business Object's Desktop Intelligence™ or Web Intelligence™.

In order to fully determine the semantics of a query from its query path, one determines how the query path is split into a collection of trees. Depending on the case, this can be done automatically or may require user attendance. Overall, one may perform the following operations. First, create the query path—possibly using user input. Next, split the query path into a collection of directed acyclic graphs, each with one root. For each DAG, extract a tree. Generate a SQL statement for each tree. Finally, process the set of SQL statements to form query results, which are displayed.

The invention utilizes a Directed Acyclic Graph (DAG). A DAG contains vertices that are related to each other by oriented edges. Vertex B is functionally dependant on vertex A if there exists an oriented path from A to B. One may also say that B depends on A and that A determines B. In a DAG, no vertex is functionally dependant on itself (the graph does not contain any circuit). A root only has outgoing edges. A leaf only has incoming edges.

A path in the DAG is a sub-graph that contains a subset of vertices and edges from the DAG. A path is a connected component if any vertex can be linked to any other, ignoring the orientation of edges. A path contains a cycle if it is possible to navigate from a vertex to itself through at least one edge, ignoring edge orientation.

A circuit is a sequence of one or more edges allowing one to navigate from a vertex to itself, following the orientation of edges. By definition, a DAG does not contain circuits but it may contain cycles.

A query on a DAG is a subset of its vertices. A query path for a query is a sub-graph P of the DAG such that (1) P contains all vertices in the query, (2) for any two vertices A and B of the query, if A determines B (or B depends on A), then P contains a directed path that goes from A to B; and (3) P is minimal: it is not possible to obtain a valid query path by removing a set of edges from P.

Figure 7:
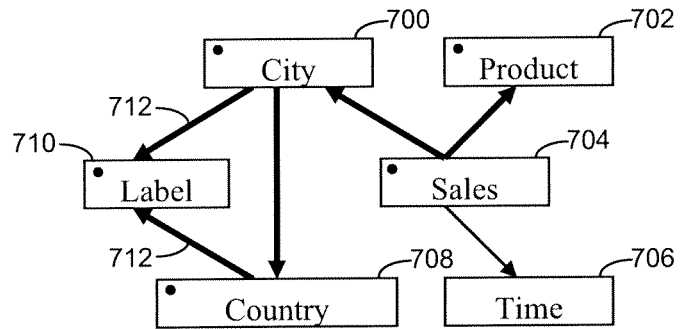
FIG. 7 illustrates a graph processed in accordance with an embodiment of the invention.

These concepts are more fully appreciated in connection with an example. FIG. 7 illustrates a set of entities: city 700, product 702, sales 704, time 706, country 708 and label 710. Bold arrows 712 define a query path. Observe that the query path includes a cycle. For example, one can navigate from the vertex city 700 back to city 700, through label 710 and country 708, if the orientation of the edges 712 are ignored. However, the query path does not include a circuit, because once edge orientation is observed, one cannot navigate from a vertex back to itself. Further observe that sales 704 is a root because it only has outgoing edges. Label 710 and product 702 are leaves since they only have incoming edges.

Figure 8:
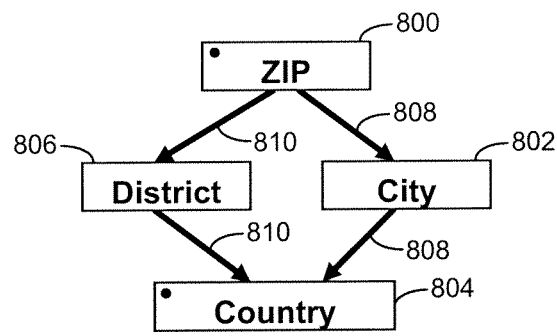
FIG. 8 illustrates a graph susceptible to ambiguous results.

There may exist more than one acceptable query path for a single query. In such an event, there is ambiguity. FIG. 8 illustrates the following entities: zip 800, city 802, country 804 and district 806. Arrows 808 illustrate a first possible query path, while arrows 810 illustrate a second possible query path. This is a case when user input (or the use of contexts—lists of joins between tables) will be necessary to disambiguate the query.

Various techniques may be used to identify query paths. One embodiment of the invention utilizes an adjacency matrix M for the transitive closure of the graph. M is defined as follows. For two vertices A and B in the graph, M(A, B) is the (possibly empty) set $I=\{I1, \ldots, In\}$ of nodes that are successors of A in an oriented path from A to B. This means that:

If there is only one directed path that goes from A to B, this path can be written $A \rightarrow I \rightarrow \ldots B$, and $M(A, B)=\{I\}$ If there is no directed path from A to B, then $M(A, B)=\{\}$ (the empty set)

If there are several paths from A to B, M(A, B) is the set of all successors of A in these paths.

This matrix can be pre-computed at design time; it holds the transitive closure of the graph.

Now let $Q=\{E1, \ldots En\}$ a query (a set of vertices in the graph).

We take the following steps:

1. Determine the set R of root vertices in the query. R is a subset of Q. It contains all vertices in the query that are not descendants from any other vertex of the query; in other words, E is in R if, for any other object F from Q, M(E, F) is the empty set. Let L=R be the set of root nodes.
2. While L is not empty
    a. For each vertex O in L, determine the set C(O) of objects from the query that are accessible from O, and possibly from other objects in L, but that are not accessible from any other non-root objects of the query. In other words, C(O) is the set of objects C of the query such that M(O, C) is non-empty, and such that M(X, C) is empty for any object X of the query that is not in L.
    b. For each vertex O in L:
        i. initialize a set S(O) as the empty set;
        ii. For each of the vertices C in C(O)
            1. initialize I=O and J=C.
            2. While I and J are different
                a. if M(I, J) is a singleton {S}, then add S to S(I); If M(I, J) is not a singleton, then let the user pick one element S in it, and add S to S(I).
                    i. if contexts have been defined, choosing a context at that point may also reduce the number of possible paths from I to J.
                b. Let I=S.
            3. End while
        iii. End for each C
    c. End for each O
    d. Assign to L the union of all C(O) of O in L.
3. End while
4. The query path has been identified. R is the set of root vertices of the query path. Then for each object O in the graph, S(O) is the set of objects that are successors of O in the query path.

As mentioned above, the paths provided by this algorithm may contain cycles. It was actually purposely defined this way. Instead of eliminating cycles a priori by design (through contexts and aliases that are expensive to maintain), it is desirable to automatically eliminate those cycles that do not make sense at runtime and propose sensible choices to the user while minimizing the designer's work.

Figure 9:
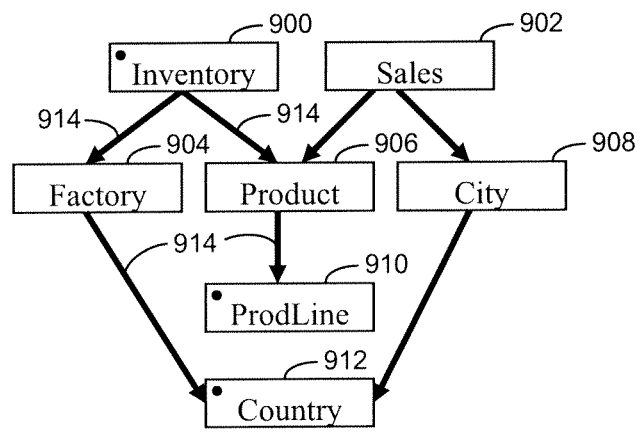
FIG. 9 illustrates a graph processed in accordance with an embodiment of the invention.

The following example illustrates how to find a query path. Consider the graph and query of FIG. 9. The graph includes the following entities: inventory 900, sales 902, factory 904, product 906, city 908, product line 910 and country 912. The vertices of the query are inventory 900, product line 910 and country 912. The adjacency matrix M can be pre-computed for the graph (independently from any query). For this example, this renders:

| From . . . to | Inventory | Sales | Factory | Product | City | ProdLine | Country |
|---|---|---|---|---|---|---|---|
| Inventory | | | {Factory} | {Product} | | {Product} | {Factory} |
| Sales | | | | {Product} | {City} | {Product} | {City} |
| Factory | | | | | | | {Country} |
| Product | | | | | | {ProdLine} | |
| City | | | | | | | {Country} |
| ProdLine | | | | | | | |
| Country | | | | | | | |

When a cell is blank in the matrix, this means that its value is the empty set. In this example, all values for M are either the empty set or singletons. This is due to the example chosen and does not change the generality of the design. Relying upon the exemplary processing set forth above, the root objects of the query are identified. This set R is reduced to {Inventory}; all other vertices in the query are descendants from Inventory. Then the following operations are performed:

| Step/remark | L | C | S |
|---|---|---|---|
| 1. Initialize L with the unique root vertex | {Inventory} | | |
| 2.a Inventory is the closest ancestor of the two other query objects. | | C(Inventory) = {ProdLine, Country} | |
| 2.b the path from Inventory to ProdLine goes through Product | | | S(Inventory) = {Product}; S(Product) = {ProdLine} |
| 2.b the path from Inventory to Country goes through City | | | S(Inventory) = {Product, City}; S(Product) = {ProdLine}; S(City) = {Country} |
| 2.d Look at the next level of query objects | {ProdLine, Country} | | |
| 2.a No other query objects | | C(ProdLine) = { } C(Country) = { } | |
| 2.b No path to compute | | | |
| 2.d Look at the next level of query objects (it is empty) | { } | | |
| 3. L is empty; we are finished | { } | | S(Inventory) = {Product, City}; S(Product) = {ProdLine}; S(City) = {Country} |

Now one can determine the entire query path. One starts from the unique root (Inventory) and uses the successive values obtained by the set S to identify which edges to insert in the query graph. This results in edges 914 being associated with the query graph.

Figure 10:
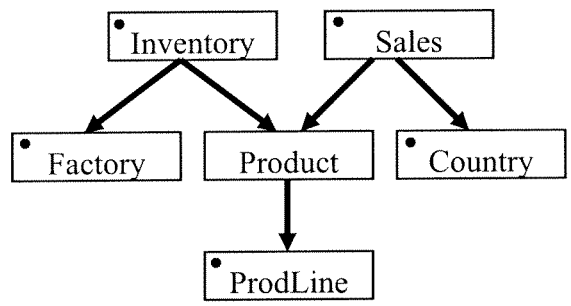
FIG. 10 illustrates a graph that may be split in accordance with an embodiment of the invention.
Figure 11:
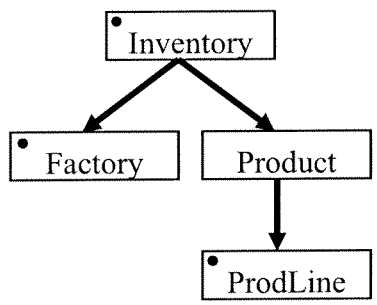
FIGS. 11 and 12 illustrate split graphs derived in accordance with an embodiment of the invention.
Figure 12:
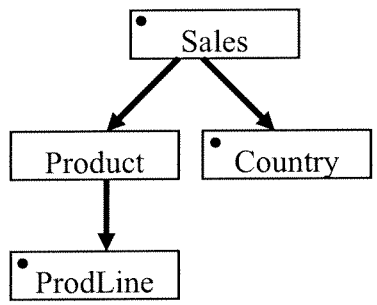

The query path is then split into one sub-graph per node. This step is fairly simple and fully automatic: for each vertex S in the set R of root vertices, select the graph formed by S and all its successors in the query path. For instance, the query path of FIG. 10 can be split into two sub-graphs, as shown in FIG. 11 and FIG. 12

Figure 13:
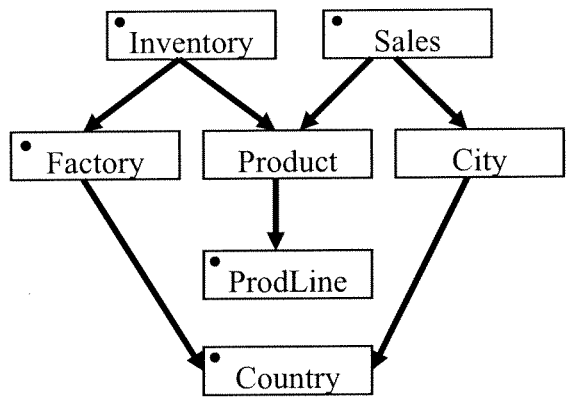
FIG. 13 illustrates a graph that may be split in accordance with an embodiment of the invention.
Figure 14:
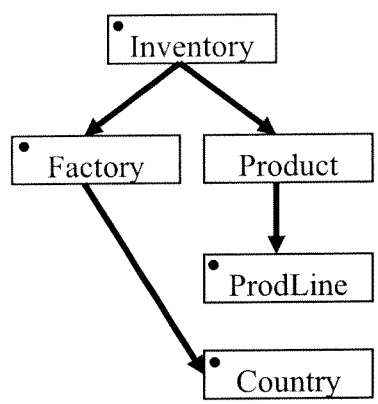
FIGS. 14 and 15 illustrate split graphs derived in accordance with an embodiment of the invention.
Figure 15:
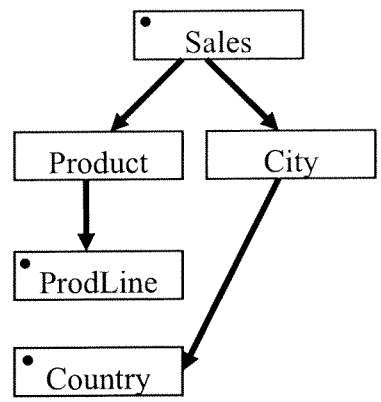

In this example, each of the obtained sub-graphs is a tree, so there's nothing left to do. This is also the case for the query path of FIG. 13, which can be split into two trees, as shown in FIGS. 14 and 15. Observe that this results in automated processing for the most frequent cycles—those related to multiple measures. One can also note that if the query path contains multiple disconnected components, they will be spread into different DAGs, each with one root.

Once each query path has only one root, an oriented tree is extracted. This is done by identifying cycles in the query path and by removing selected edges from these cycles.

Initially, "simple cycles" in the query path are identified. Each vertex in a cycle has two edges of the cycle pointing to it ("incoming edge") or from it ("outgoing edge"). A "fan trap" is a vertex that has two incoming edges in the cycle. A "source" is a vertex that has two outgoing edges in the cycle. In a cycle, two fan traps are always separated by two sources and vice-versa. A "simple cycle" is a cycle that contains only one fan trap and one source. It can be proven that if a query path with one root contains a cycle, then it always contains a simple cycle. By detecting and removing selected edges from each simple cycle, a DAG is transformed into a directed tree.

The following discussion is directed toward explaining how to detect simple cycles and their fan traps. Afterwards, there is a description of how to process these cycles based on the user's intended semantics for the query.

One specific approach to finding simple cycles in a query path includes the following operations.

1. Select any edge in the path and (temporarily) remove it from the query path. If one finds any other non-oriented path between its ends (using a classical tree search algorithm), then there is a cycle. This cycle contains only distinct vertices. Also, each vertex has exactly two neighbors in the cycle. If no cycle is found, processing is completed. Otherwise, C is designated as this cycle.
2. C contains a succession of sources and fan traps.
3. While C contains more than one fan trap (and one source):
   a. Let D(V) be the distance of a vertex V to the root—i.e., the minimal number of edges of an oriented path relating the root to V. Now, choose one of the fan traps F in C that has the smallest distance to the root, and identify its two surrounding sources S and T.
   b. S and T have a common ancestor—the (unique) root. So there exists a (non-oriented) path P between them that does not contain their common descendant F. Find such a path by (temporarily) removing all descendents of S and T, and using a tree search algorithm.
   c. Connect P with the path that relates S to F and T in the initial cycle C: it yields another cycle C'. All vertices other than F in this new cycle are strictly closer to the root than F; in other terms, for any vertex V in L', D(V)<D(F) if V<>F.
   d. Let C=C'
4. End while
5. C is a "simple cycle" with one source and one fan trap F.
6. Act on F using one of the two strategies defined below. This will remove at least one edge of C. Then go back to step 1. To look for other simple cycles.

This loop 3-4 always terminates, because at each iteration, if the new cycle contains another fan trap than F, then it is strictly closer to the root than F.

Figure 16:
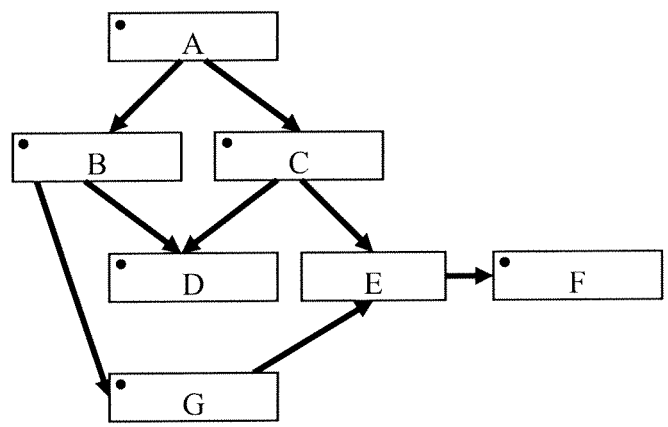
FIG. 16 illustrates the derivation of a simple cycle from a complex graph in accordance with an embodiment of the invention.
Figure 17:
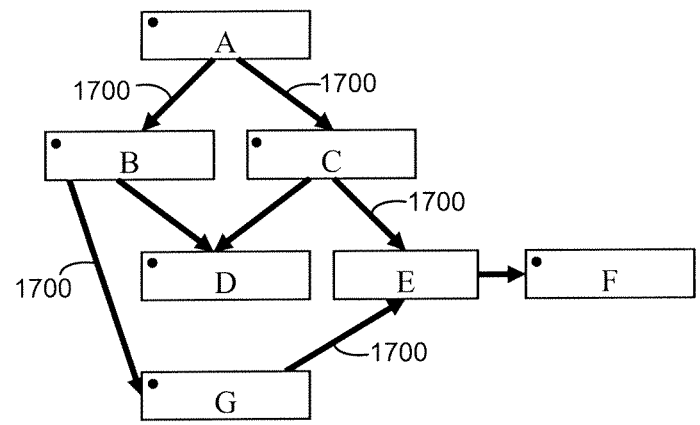
FIG. 17 illustrates the result of the processing of FIG. 16.

For instance, we can extract a simple cycle from the complex query path of FIG. 16. Start with an arbitrary cycle, such as the cycle marked by arrows 1600 in FIG. 16. E is a fan trap (D is also a fan trap). E is a fan trap with minimal distance (equal to 2) to the root A. Then, consider the sources C and G that surround E. We find another cycle by searching a shortest path between them that does not contain D or E. In this case, the path C-A-B-G qualifies. This path is connected with the path that relates G and C via E. This results in the cycle of FIG. 17, where the cycle is defined by arrows 1700. This new cycle has only one fan trap (E) and one source (A). It is a simple cycle.

Figure 18:
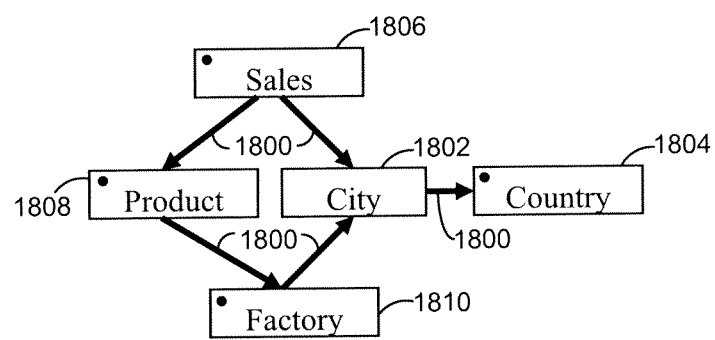
FIG. 18 illustrates a query path processed in accordance with an embodiment of the invention.

Once a simple cycle and its fan trap have been identified, one can choose different ways of removing selected edges in the cycle. For this, input is solicited because depending on the context, one may want to express different questions with apparently similar queries. In order to illustrate the possible actions, reference is made to FIG. 18. A query path is illustrated by arrows 1800.

A vertex that is not in the query cannot be a leaf or a root. This means that the fan trap vertex either belongs to the query or has at least one descendant in the query. Among all descendants of the fan trap that are in the query, pick one that is a minimal distance from the fan trap. This object is called a "query fan trap". In this example, City 1802 has descendant Country 1804, which is in the query. Likewise, the source of the cycle must be in the query, or it should have an ancestor that is. In this example, the vertex Sales 1806 itself is in the query and is referred to as a "query source".

One important property of the query path is the following: when there are multiple paths relating two vertices, then each of these paths contains a different set of vertices from the query. In this example, one can see that there are two ways of relating sales 1806 (the source query object) to country 1804 (the fan trap query vertex) in the query path:
 directly (through the city table 1802)
 indirectly through product 1808 (and Factory 1810 and city 1802).

This means that one can designate these two paths to the user using only names of vertices that are in the query. Users don't need to know about the subtleties of the underlying database schema to explain what they want. They don't need to know, for instance, that a "city" table exists. Based on this, one can ask the user to choose what they want using only objects that are in the query. The user is presented with the two sets of query objects that relate the query source to the query fan trap and propose different options. Typical options presented to the user imply:
 keep only one of the two paths from the source query vertex to the fan trap query vertex;
 keep these two paths and generate a unique SQL statement that will apply all joins; this is the only case when one generates SQL from a query path that is not a tree, and in the current technology it happens when no context exists.

In this example, one would present the user with two possible paths from the query source to the query fan trap: Sales 1806 to Country 1804 or Sales 1806 to Product 1808 to Factory 1810 to Country 1804. This may be done graphically and/or textually at a computer monitor. The following table exemplifies the options proposed to a user in the above example.

| User Option | Business Question | Action |
| --- | --- | --- |
| Only consider Sales to Country | Sales per Product and Country (with each product's factory) | Remove the edge between Factory and City |
| Only consider Sales to Product to Factory to Country | Sales per Product, with factory of the Product and Country of the Factory | Remove the edge between Sales and City |
| Use both | local sales for each product in the country where it's manufactured | Keep the cycle and apply all joins at once in the query |

It is also possible to predefine the behavior to adopt instead of asking the user for input. For this one can attach a piece of metadata to the vertices in the graph that can be fan traps. This piece of metadata, when present, will dictate the choice to use when the vertex is in a cycle.

Figure 19:
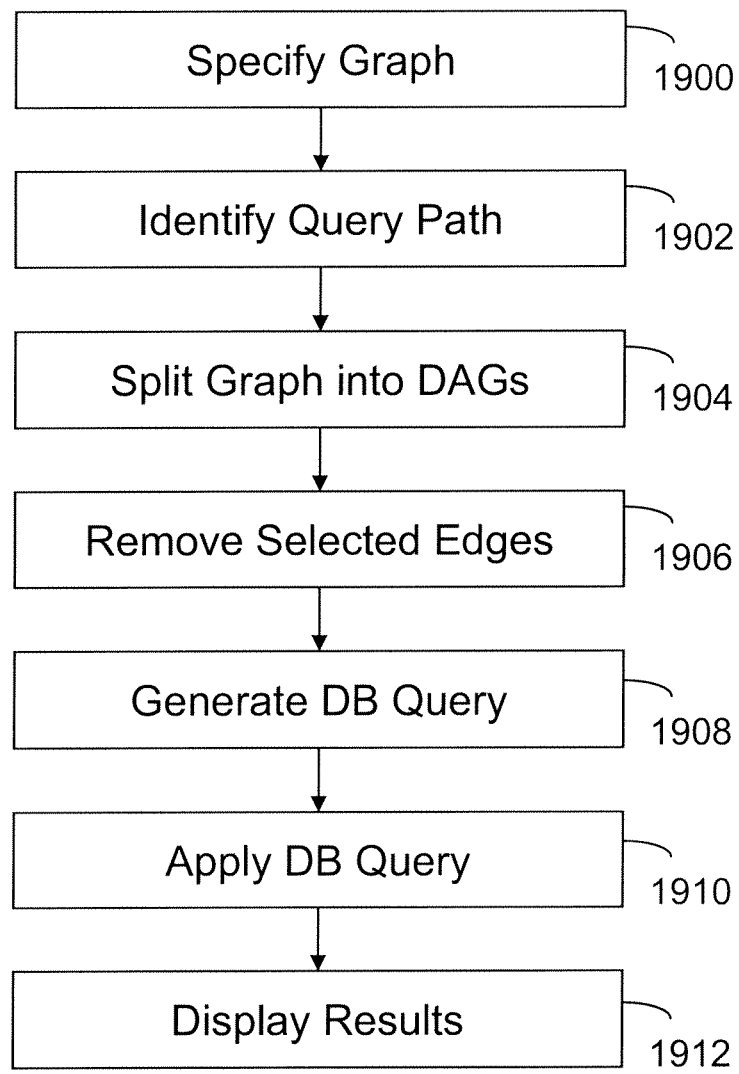
FIG. 19 illustrates processing operations performed in accordance with an embodiment of the invention.

The foregoing processing is summarized in the process flow of FIG. 19. FIG. 19 illustrates an initial operation to specify a set of database tables and joins to form a graph 1900. A query path is then identified 1902. The graph is then split into a set of directed acyclic graphs 1904. Selected oriented edges are then removed from each directed acyclic graph 1906. A database query is then generated for each tree 1908. The database queries are then applied to the database tables to produce query results 1910. The query results are then displayed to the user 1912. Alternately, the query results may be further processed.

Figure 20:
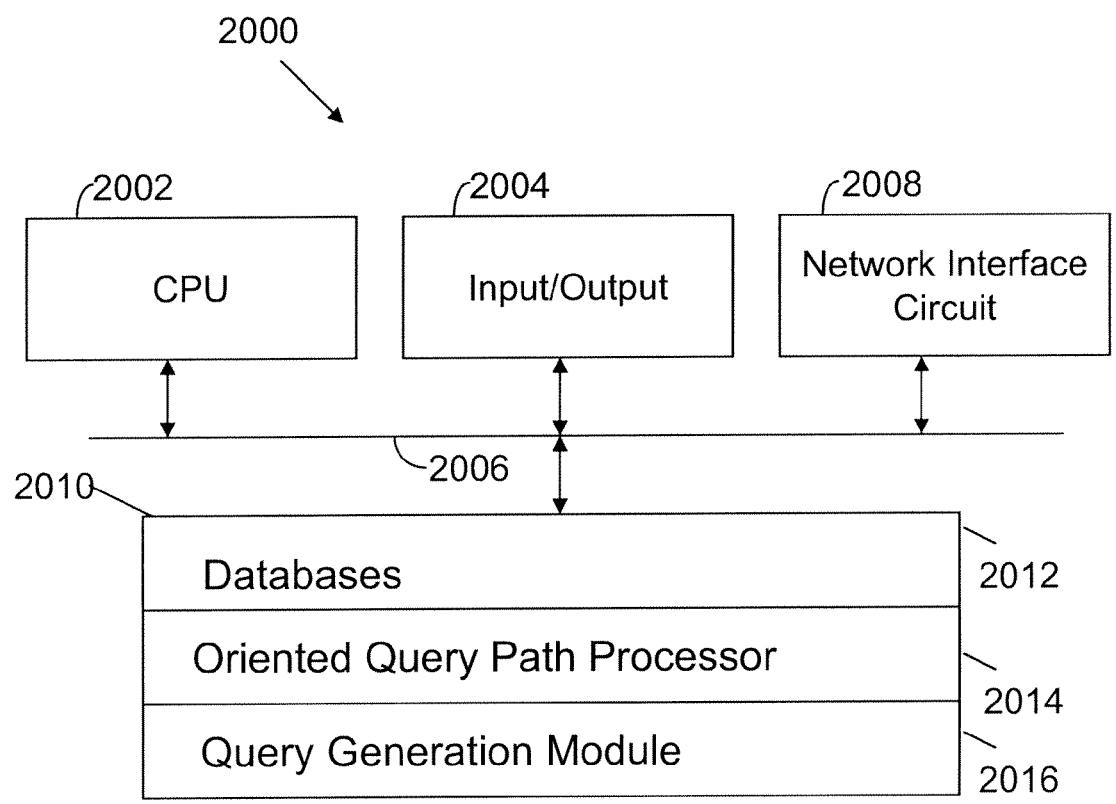
FIG. 20 illustrates a computer configured in accordance with an embodiment of the invention.

FIG. 20 illustrates a computer 2000 configured in accordance with an embodiment of the invention. The computer includes standard components, such as a central processing unit 2002 and input/output devices 2004 connected via a bus 2006. The input/output devices 2004 may include a keyboard, mouse, display, printer and the like. A network interface circuit (NIC) 2008 is also connected to the bus to provide connectivity to a network (not shown). Thus, the computer may operate in a networked environment.

A memory 2010 is also connected to the bus 2006. The memory includes data and executable instructions to implement operations of the invention. In particular, the memory stores one or more databases 2012 that are processed in accordance with the invention. An oriented query path processor 2014 includes executable instructions to implement the operations 1900-1906 of FIG. 19. A query generation module 2016, which may be a prior art query generation system, such as the type disclosed in previously referenced U.S. Pat. No. 5,555,403, may be used to implement operations 1908-1912 of FIG. 19.

The modules in memory 10 are exemplary. These modules may be combined or broken down into additional modules. Similarly, the databases and modules may be distributed across a network. It is the operations of the invention that are significant, not the particular location or manner in which those operations are executed.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, comprising executable instructions to:
   specify a set of database tables defining vertices and database joins defining oriented edges to form a graph, wherein the oriented edges specify directionality characterizing dependent relationships between the database tables;
   identify a query path in the graph;
   split the graph into a set of directed acyclic graphs, wherein each directed acyclic graph has a single root vertex that does not form a path to itself through oriented edges;
   remove all selected oriented edges from each directed acyclic graph to form a tree corresponding to each directed acyclic graph, wherein the tree is a sub-graph of one of the set of directed acyclic graphs without loops and one list of joins relates any two database tables in the tree, wherein the removing comprises identifying a simple cycle in the one of the set of directed acyclic graphs that contains only one fan trap and one source, wherein a fan trap is a vertex with two incoming edges, wherein at least a portion of the removed selected oriented edges are within the simple cycle;
   wherein the simple cycle is identified in the directed acyclic graph by:
      selecting any edge in the query path and removing such selected edge from the query path;
      determining that there is a cycle C if there is one other non-oriented path between ends of the selected edge; and
      determining that there is not a cycle if there is not one other non-oriented path between the ends of the selected edge,
      wherein when the determined cycle C comprises more than one fan trap and one source:
         selecting one of the fan traps F having a smallest distance to a root, identifying its two surrounding sources S and T,
         finding a path P between S and T that does not contain a common descendant, and connecting path P with the path that relates S to F and T in cycle C to yield a new cycle C',
      wherein the new cycle C' is the simple cycle;
   generate a database query for each tree;
   apply each database query for each tree to the database tables that correspond to the vertices in the tree to form query results; and
   display the query results.

2. The computer readable storage medium of claim 1 wherein each fan trap is annotated by metadata associated with the vertex of the fan trap.

3. The computer readable storage medium of claim 1 wherein the executable instructions to remove include executable instructions to receive input from a user specifying a selected oriented edge to be removed.

4. The computer readable storage medium of claim 3 further comprising executable instructions to supply the user with names of vertices associated with the database query.

5. The computer readable storage medium of claim 3 further comprising executable instructions to supply the user with paths to the fan trap.

6. The computer readable storage medium of claim 1 wherein the executable instructions to identify the query path include executable instructions to process an adjacency matrix to identify the query path.

7. The computer readable storage medium of claim 1 further comprising executable instructions to split the query path into one sub-graph per root vertex.

8. A method for implementation by one or more data processors comprising:
specifying, by at least one data processor, a set of database tables defining vertices and database joins defining oriented edges to form a graph, wherein the oriented edges specify directionality characterizing dependent relationships between the database tables;
identifying a plurality of query paths in the graph;
splitting, by at least one data processor, the graph into one or more directed acyclic graphs, wherein each directed acyclic graph has a single root vertex that does not form a path to itself through oriented edges; and
removing, by at least one data processor, selected oriented database joins from each directed acyclic graph to form a tree corresponding to each directed acyclic graph, the removal of the selected oriented database joins minimizing redundancy caused by querying, using the plurality of query paths, of data associated with a vertex of the graph, wherein the removing comprises identifying a simple cycle in each directed acyclic graph that contains only one fan trap and one source, wherein a fan trap is a vertex with two incoming edges, wherein at least a portion of the removed selected oriented edges are within the simple cycle;
wherein the simple cycle is identified in the directed acyclic graph by:
selecting any edge in the query path and removing such selected edge from the query path;
determining that there is a cycle C if there is one other non-oriented path between ends of the selected edge; and
determining that there is not a cycle if there is not one other non-oriented path between the ends of the selected edge;
wherein when the determined cycle C comprises more than one fan trap and one source:
selecting one of the fan traps F having a smallest distance to a root, identifying its two surrounding sources S and T,
finding a path P between S and T that does not contain a common descendant, and connecting path P with the path that relates S to F and T in cycle C to yield a new cycle C',
wherein the new cycle C' is the simple cycle;
generate, by at least one data processor, a database query for each tree;
apply, by at least one data processor, each database query for each tree to the database tables that correspond to the vertices in the tree to form query results; and
display, by at least one data processor, the query results.

9. The method of claim 8, wherein the removal of the selected oriented database joins comprises elimination of at least one of one or more fan traps and one or more sources, each source being a vertex that has two or more outgoing oriented database joins.

10. A system comprising:
at least one programmable processor; and
a machine-readable medium storing instructions that, when executed by the at least one processor, cause the at least one programmable processor to perform operations comprising:
specifying a graph including vertices joined by oriented database joins, the vertices characterizing corresponding database tables and the oriented database joins characterizing dependent relationships between database tables;
identifying a plurality of query paths;
splitting the graph into one or more directed acyclic graphs, wherein each directed acyclic graph has a single root vertex that does not form a path to itself through oriented edges; and
removing selected oriented database joins from each directed acyclic graph to form a tree corresponding to each directed acyclic graph, the removal of the selected oriented database joins eliminating at least one of one or more fan traps and one or more sources from corresponding directed acyclic graph, each fan trap being a vertex that has two or more incoming oriented database joins, each source being a vertex that has two or more outgoing oriented database joins, wherein the removing comprises identifying a simple cycle in a directed acyclic graph that contains only one fan trap and one source, wherein at least a portion of the removed selected oriented edges are within the simple cycle;
wherein the simple cycle is identified in the directed acyclic graph by:
selecting any edge in the query path and removing such selected edge from the query path;
determining that there is a cycle C if there is one other non-oriented path between ends of the selected edge; and
determining that there is not a cycle if there is not one other non-oriented path between the ends of the selected edge,
wherein when the determined cycle C comprises more than one fan trap and one source:
selecting one of the fan traps F having a smallest distance to a root, identifying its two surrounding sources S and T,
finding a path P between S and T that does not contain a common descendant, and connecting path P with the path that relates S to F and T in cycle C to yield a new cycle C',
wherein the new cycle C' is the simple cycle;
generating a database query for each tree;
applying each database query for each tree to the database tables that correspond to the vertices in the tree to form query results; and
displaying the results.

* * * * *